(12) United States Patent
Ozaki

(10) Patent No.: US 8,171,222 B2
(45) Date of Patent: May 1, 2012

(54) MEMORY ACCESS SYSTEM, MEMORY CONTROL APPARATUS, MEMORY CONTROL METHOD AND PROGRAM

(75) Inventor: Koji Ozaki, Kanagawa (JP)

(73) Assignee: Sony Corporation, Tokyo (JP)

( * ) Notice: Subject to any disclaimer, the term of this patent is extended or adjusted under 35 U.S.C. 154(b) by 420 days.

(21) Appl. No.: 12/453,953

(22) Filed: May 28, 2009

(65) Prior Publication Data

US 2010/0023694 A1 Jan. 28, 2010

(30) Foreign Application Priority Data

Jul. 24, 2008 (JP) ................................. 2008-191368

(51) Int. Cl.
*G06F 12/08* (2006.01)

(52) U.S. Cl. ......... 711/119; 711/E12.001; 711/E12.023; 710/113; 710/240

(58) Field of Classification Search .................. 711/119, 711/12.001, E12.023; 710/113, 240
See application file for complete search history.

(56) References Cited

U.S. PATENT DOCUMENTS

2004/0243900 A1* 12/2004 Henkel .......................... 714/742
2005/0050302 A1*  3/2005 Henkel .......................... 712/214

FOREIGN PATENT DOCUMENTS

| JP | 2003-186740 A | 7/2003 |
|----|---------------|--------|
| JP | 2006-260472   | 9/2006 |
| JP | 2007-018222   | 1/2007 |

OTHER PUBLICATIONS

Japanese Office Action issued Apr. 27, 2010 for corresponding Japanese Application No. 2008-191368.

* cited by examiner

*Primary Examiner* — Hoai V Ho
(74) *Attorney, Agent, or Firm* — Rader Fishman & Grauer, PLLC

(57) ABSTRACT

A memory control apparatus disposed in a memory access system having a bus, a single storage unit with a bank structure and a bus arbitrating unit, includes: an access-request accepting means for accepting sequential access requests for data located at sequential addresses in the storage unit, sequential access requests for data located at discrete addresses in the storage unit as sequential access requests, or access requests for data located at sequential addresses in the storage unit which cannot be made into a single access request as sequential access requests; and an access-request rearranging means for rearranging sequential access requests accepted by the access-request accepting means in an order of banks of the storage unit within a range of access requests relating to either a data write request output from one of data processing units or a data read request output therefrom to control an access control of the storage unit.

14 Claims, 20 Drawing Sheets

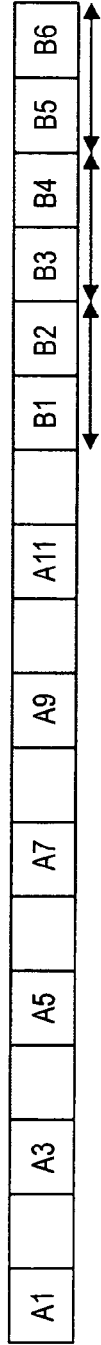
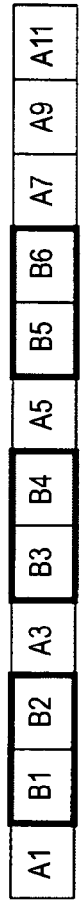
FIG.3A ADDRESS ARRANGEMENT
FIG.3B TRANSFER EXAMPLE A
WITH SAME AMOUNT OF DATA, B WHICH HAS STARTED LATER COMPLETES TRANSFER EARLY
BURST ACCESS REQUESTS ARE IN THICK LINE
FIG.3C TRANSFER EXAMPLE B
B WHICH HAS STARTED LATER COMPLETES TRANSFER LATER
SEQUENTIAL ACCESS REQUESTS ARE IN BROKEN LINE
EXAMPLE OF CASE OF ACCESS UP TO TWO SEQUENTIAL ACCESS REQUESTS

FIG.4A

ADDRESS ARRANGEMENT

| 1 | 2 | 3 | 4 |
|---|---|---|---|
| 5 | 6 | 7 | 8 |
| 9 | 10 | 11 | 12 |
| 13 | 14 | 15 | 16 |

FIG.4B

TRANSFER PATTERN

| 3 | 4 | | 7 | 8 | | 11 | 12 | | 15 | 16 |

DIVIDE ADDRESSES FOR THEY ARE DISCRETE

FIG.4C

| 3 | 4 | 7 | 8 | | 11 | 12 | 15 | 16 |

TRANSFER ADDRESSES THOUGH THEY ARE DISCRETE

FIG.4D

| 1 | 2 | 3 | 4 |
|---|---|---|---|
| 5 | 6 | 7 | 8 |
| 9 | 10 | 11 | 12 |
| 13 | 14 | 15 | 16 |

BOUNDARY ---

FIG.4E

| 11 | 12 | | 13 | 14 |

DIVIDE FOR ACCESS REQUESTS CROSS OVER BOUNDARY

FIG.4F

| 11 | 12 | 13 | 14 |

SEQUENTIALLY TRANSFER THOUGH ACCESS REQUESTS CROSS OVER BOUNDARY

THICK-LINED FRAME IS SINGLE ACCESS REQUEST

INFLUENCE ACCORDING TO ACCESS REQUEST BOUNDARY CONDITION
(IN CASE OF UP TO FOUR SEQUENTIAL ACCESS REQUESTS)

FIG.5

THE NUMBER OF SEQUENTIAL ACCESS REQUEST TRANSFERS ACCORDING TO
THE ALREADY KNOWN NUMBER OF SEQUENTIAL ACCESS REQUESTS

| THE NUMBER OF ACCESS REQUESTS KNOWN | PATTERN OF SEQUENTIAL ACCESS REQUESTS |
|---|---|
| 1 | 1 |
| 2 | 2 |
| 3 | 3 |
| 4 | 4 |
| 5 | 3+2 |
| 6 | 3+3 |
| 7 | 4+3 |
| 8 OR GREATER | 4 UNTIL IT BECOMES 8 OR SMALLER, SAME AS THE CASE OF 1 TO 7 WHEN IT IS 8 OR LESS |

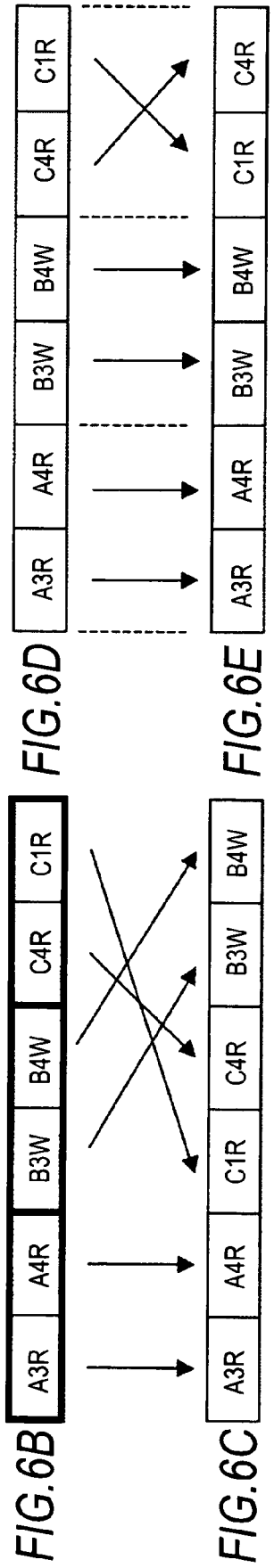

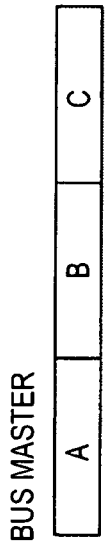
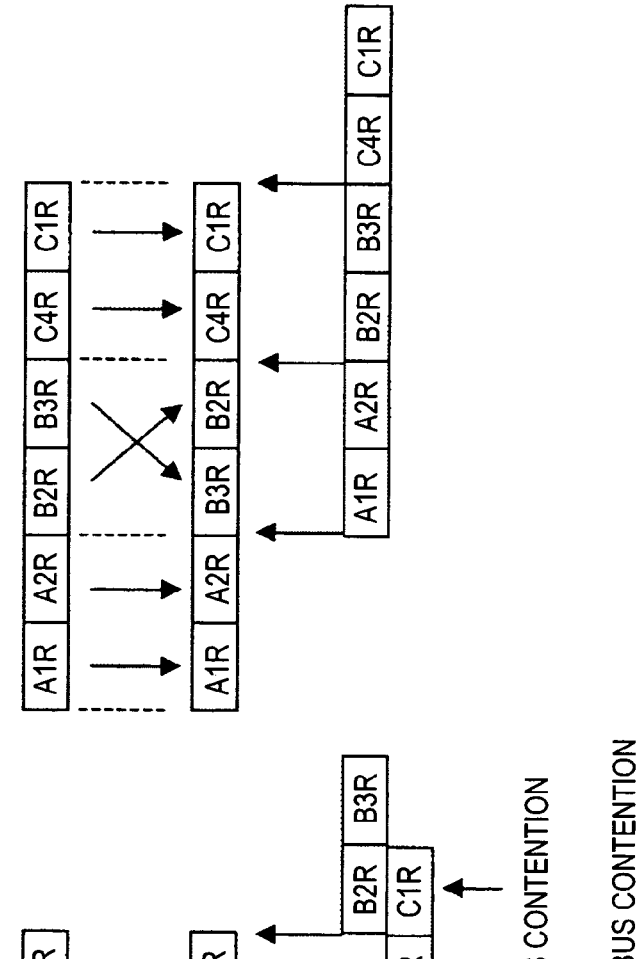
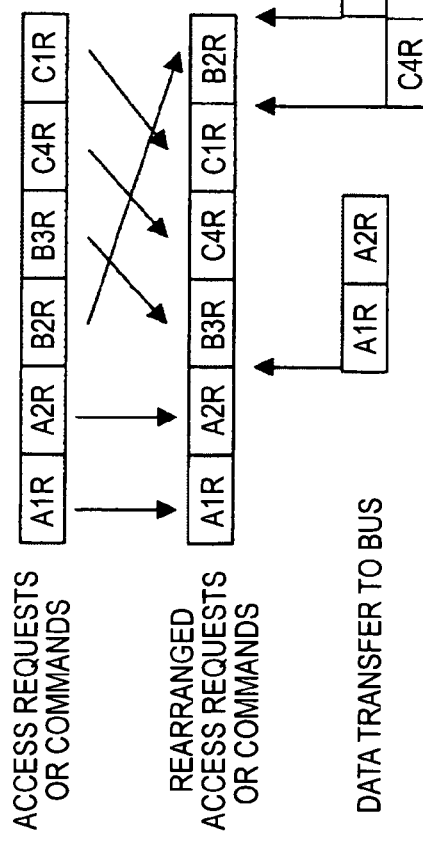

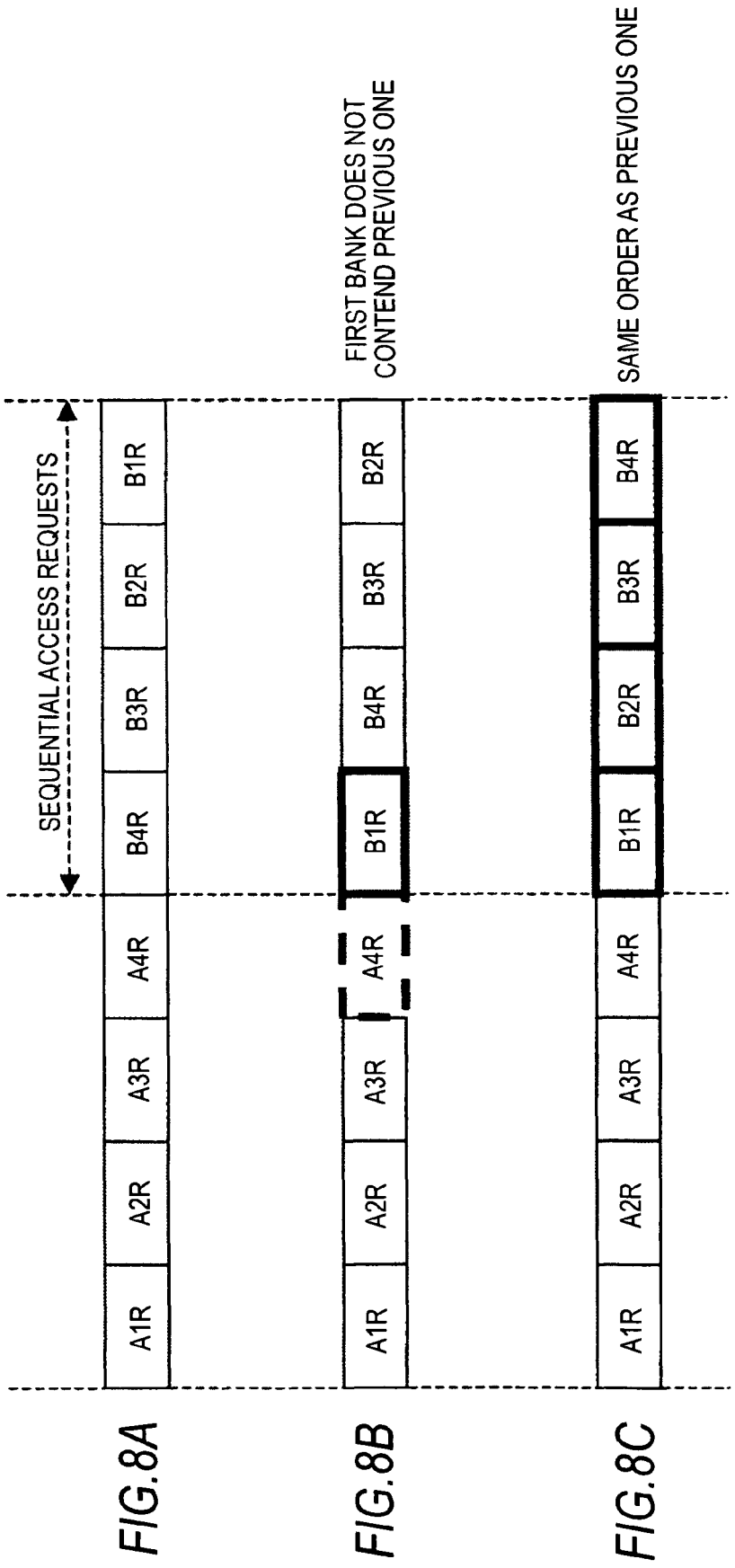

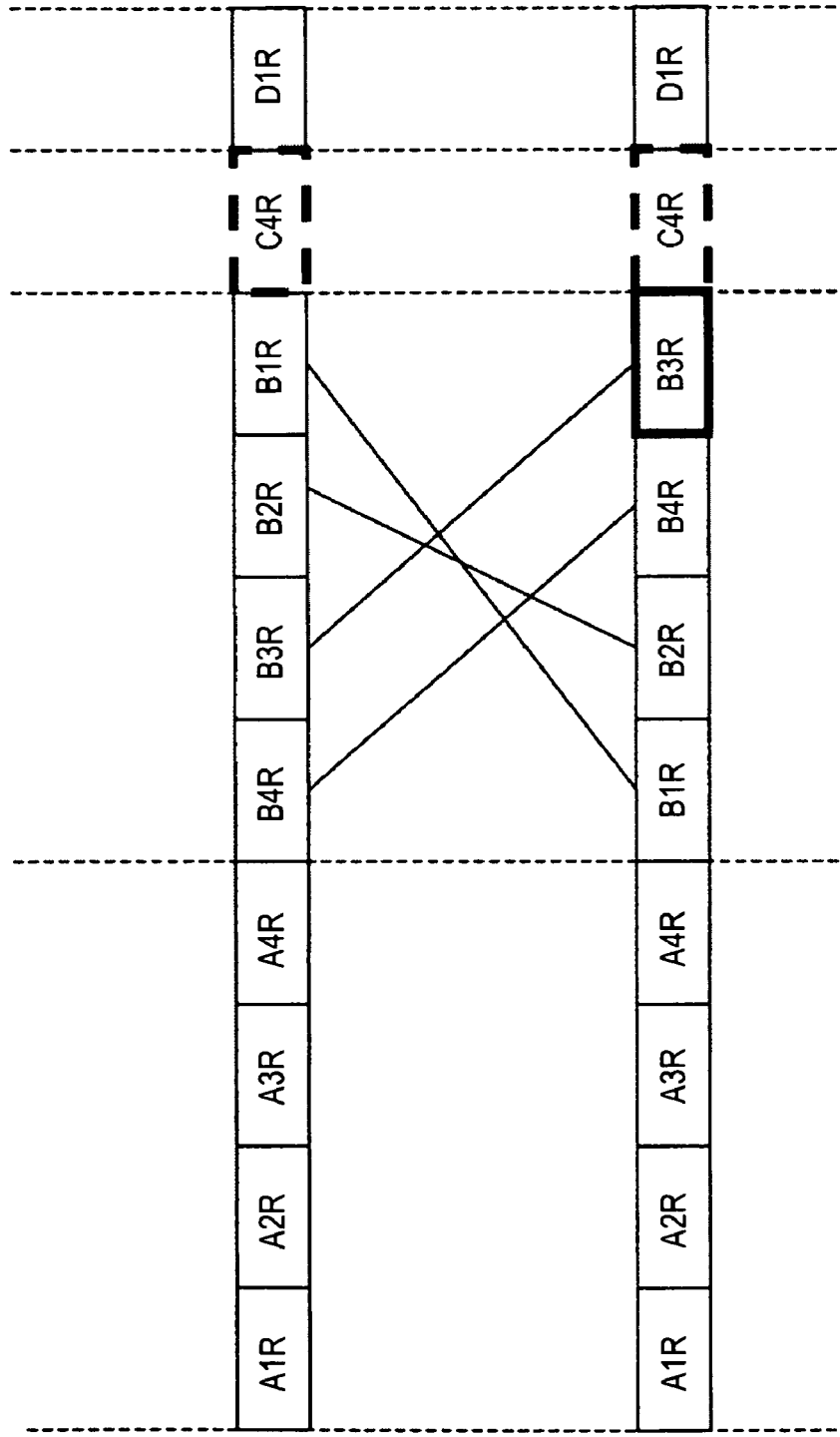

A-J INDICATE DATA AND NUMERALS INDICATE BANKS
A-B HAVE SAME DATA STORED IN FOUR BANKS

BANK 1 IN CONTENTION

CONTENTION IS REDUCED BY SETTING PART OF ACCESSES TO BANK 1 TO BANKS 2-4

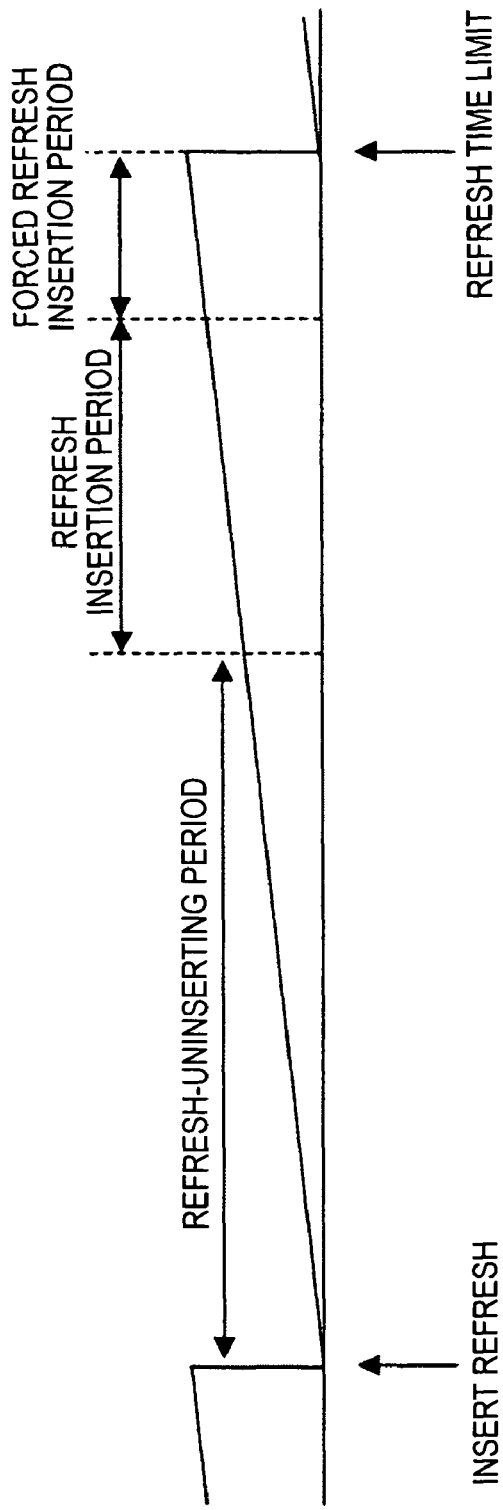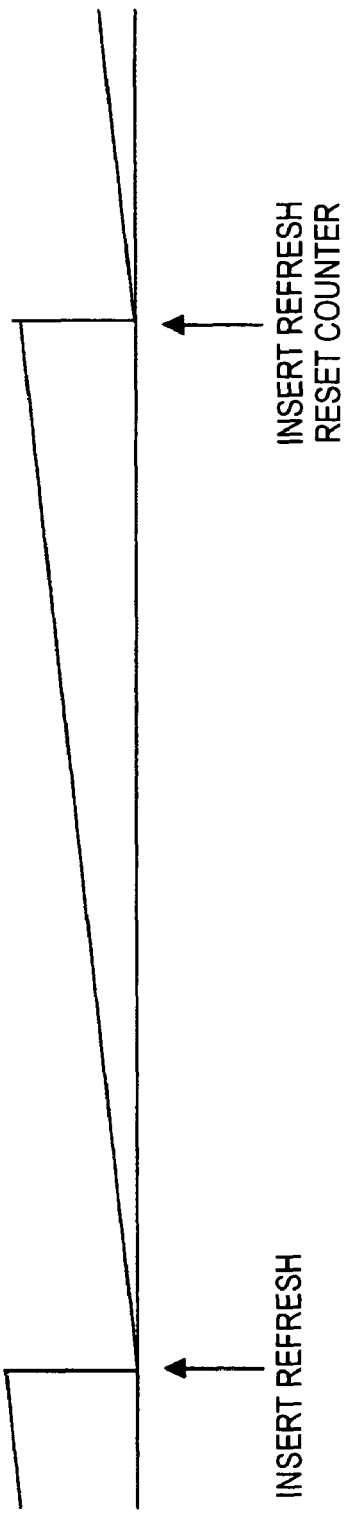

FIG.15A

| A1R | A2R | A3R | A4R | B4R | B3R | B2R | B1R | C4R | | D4R |

FIG.15B

| A1R | A2R | A3R | A4R | B1R | B2R | B4R | B3R | C4R | D3R ← INSERT ACCESS REQUEST | D4R |

FIG.15C

| D3R ← LOWER SIDE OF ADDRESS | D4R | D1R ← UPPER SIDE OF ADDRESS |

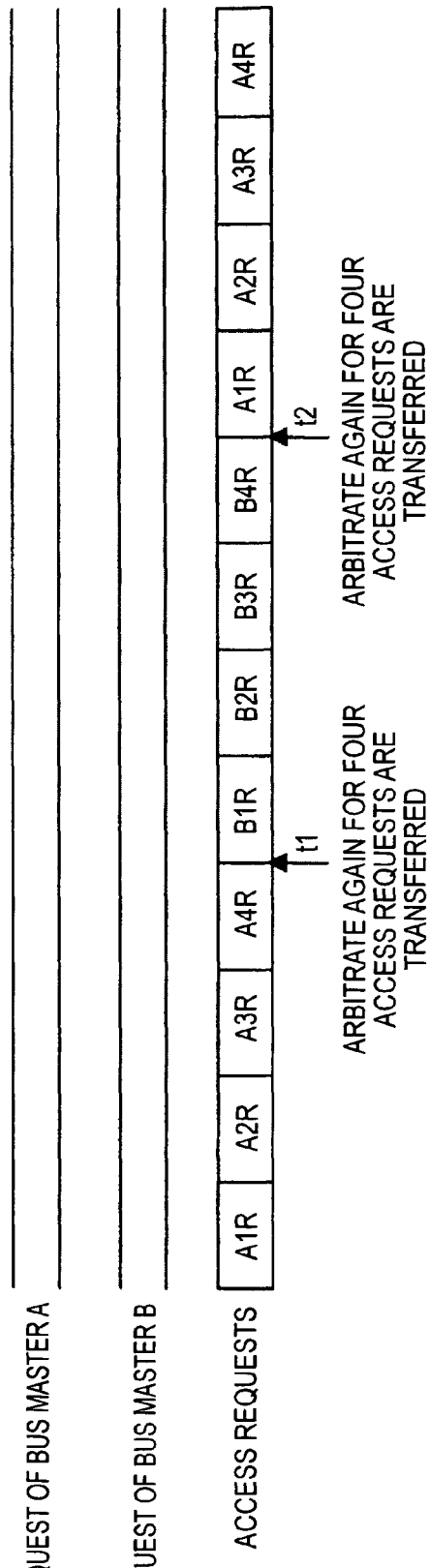

FIG. 18A
FIG. 18B

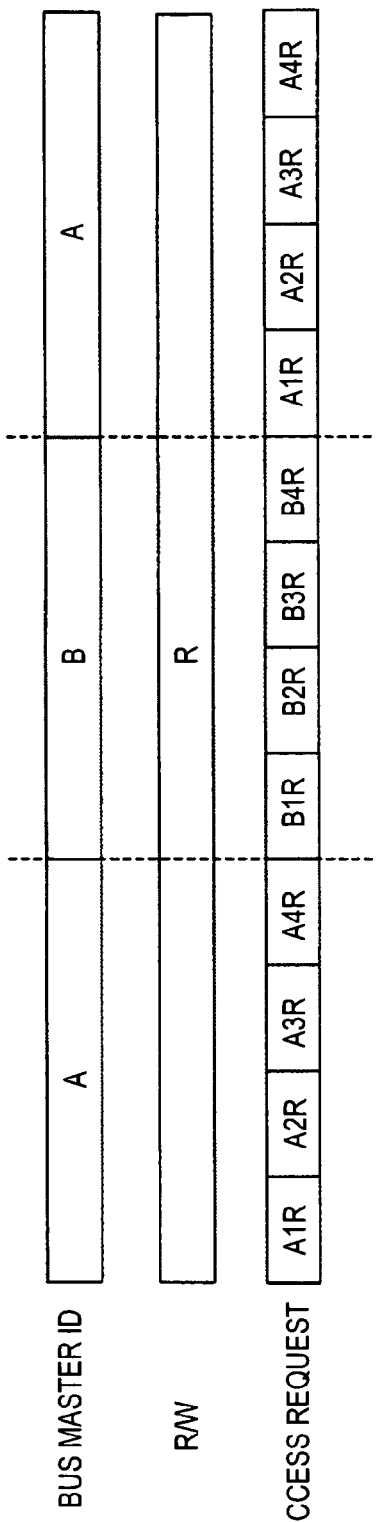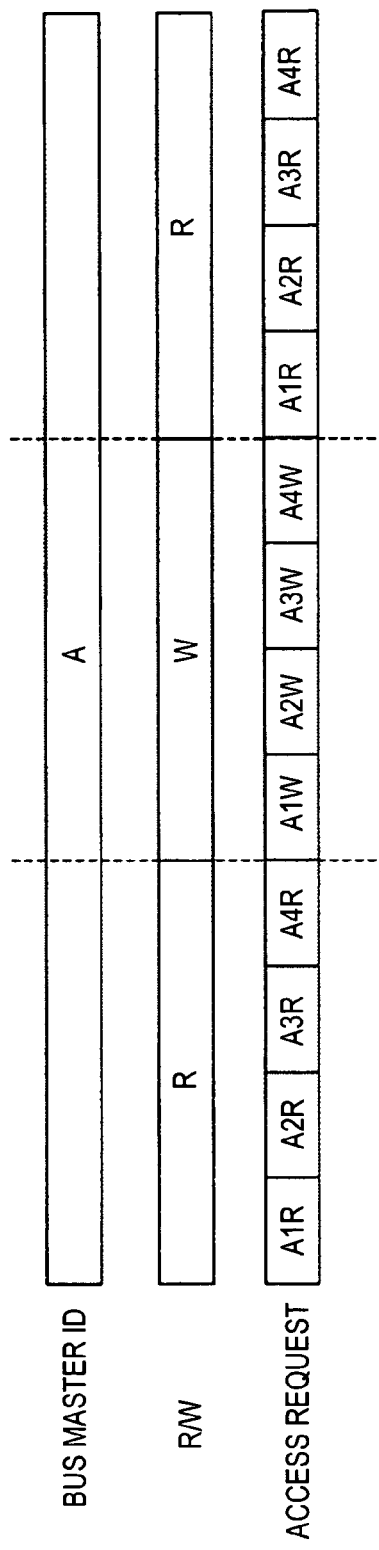

MEMORY ACCESS SYSTEM, MEMORY CONTROL APPARATUS, MEMORY CONTROL METHOD AND PROGRAM

BACKGROUND OF THE INVENTION

1. Field of the Invention

The present invention relates to a memory access system which allows a plurality of data processing units to write data in a single storage unit (memory) or read data therefrom, and a memory control apparatus, a memory control method, and a program which are adapted to the memory access system.

Particularly, the present invention relates to a memory access system which has a bus arbitrating unit which arbitrates contention of a bus in use at the time a plurality of data processing units connected to the bus write data in a single storage unit or read data therefrom, and a memory control apparatus which controls the storage unit, and a memory control apparatus, a memory control method, and a program which are adapted to the memory access system.

2. Description of the Related Art

A memory access system in which a plurality of data processing units perform data writing or data reading on a single storage unit (memory), e.g., a single DRAM is used in various fields.

There is a memory access system (or signal processing system) in which a plurality of data processing units write image data to a single memory and read written image data from the memory, so that the plurality of data processing units use the image data stored in the memory to execute desired signal processing.

In such a memory access system, there is a case where a plurality of data processing units simultaneously generate data write requests or data read requests with respect to a single memory.

Hereinafter, a data write request or a data read request with respect to a storage unit (memory) is generally termed as "access request" with respect to a storage unit (memory).

A bus arbitrating unit (bus arbiter) arbitrates contention of bus usage when access requests are generated from a plurality of data processing units with respect to a single memory at the same timing.

A memory such as DRAM can be accessed bank by bank.

In this respect, there is an attempt such that when a plurality of data processing units make access requests, a memory controller is provided between the bus and the memory to process the access requests bank by bank to enable bank-by-bank access, thus improving the memory access efficiency.

Related arts which improve such a memory access efficiency are exemplified below.

Patent Document 2 (JP-A-2007-18222) discloses a technique of dividing an access request from a data processing unit (bus master) to a memory bank by bank, and combines the access request with an access request from another data processing unit when there is a bank which does not involve a transfer request. This improves the memory access efficiency.

Patent Document 2 (JP-A-2006-260472) discloses a technique of changing the bank-by-bank order of access requests without particularly limiting the rearrangement of the access requests.

However, when the methods disclosed in Patent Documents 1 and 2 are used, the order of memory accesses from different bus masters (data processing units) is changed. The details are given later in comparison with embodiments of the present invention.

When the order of memory accesses from different bus masters (data processing units) is changed, there may be a case where even if a bus master B attempts to read data written by a bus master A immediately after the data is written, the bus master cannot read the data written by the bus master A. A specific example of the case is described later in comparison with the embodiments of the present invention referring to the accompanying drawings.

SUMMARY OF THE INVENTION

When the order of writing data to a memory from the same bus master (data processing unit) and reading data from the memory is changed, there may be a case where even if the same bus master attempts to read data written in the memory immediately after the data is written, the bus master cannot read the data correctly.

Further, when there priority is given to bus masters (data processing units), the memory control apparatus (memory controller) needs to manage the levels of priority, thus complicating the contents of the process of the memory control apparatus and the configuration thereof.

While a access request to the memory is divided in the techniques disclosed in Patent Documents 1 and 2, accesses which can be generated in a single access request are subject to restrictions, e.g., (a) sequential addresses are needed, and (b) the boundary of 1 kB should not be cross over depending on a bus. Depending on a bus master (data processing unit), therefore, a access request is divided finely for addresses are not sequential even if there is data.

There is another problem such that the data size of an access request from a bus master (data processing unit) becomes larger, so that even with the same data amount, the time needed to transfer the data differs.

The following describes a case where a plurality of access requests are separated and the bank-by-bank order is changed without particularly limiting the order to write or read data to or from the memory.

When reading sequential data from the memory is a combination of data which is needed at the last one of a plurality of access requests, data of a plurality of access requests is obtained in a little memory access time. This results in a problem such that the memory controller needs to send a greater amount of data than is specified by the memory access to the bus master, causing contention of bus usage.

Thus, it is therefore desirable to provide a memory access system with a higher access efficiency which overcomes the problem.

There is also a need for a preferable memory control apparatus (memory controller) for use in the memory access system with a higher access efficiency.

There is a further need for a preferable memory control method and a preferable program which are adapted to use in the memory access system with a higher access efficiency.

According to an embodiment of the present invention, there is provided a memory control apparatus disposed in a memory access system having a bus, a single storage unit with a bank structure, and a bus arbitrating unit which arbitrates data write requests to the storage unit from a plurality of data processing units connected to the bus, or a data read request from the storage unit does not cause contention. The memory control apparatus includes an access-request accepting means; and an access-request rearranging means. The access-request accepting means accepts a plurality of sequential access requests for data located at sequential addresses in the storage unit, a plurality of sequential access requests for data located at discrete addresses in the storage unit, as a plurality of sequential access requests, or access requests for data located at sequential addresses in the storage unit which cannot be made into a single access request, as a plurality of sequential access requests. The access-request rearranging means rearranges at least sequential access requests accepted by the access-request accepting means in an order of banks of the storage unit within a range of access requests relating to either a data write request output from one of the data processing units or a data read request output therefrom to control an access control of the storage unit.

It is preferable that for the sequential access requests, the access-request rearranging means rearrange an access request which does not contend with a last access request rearranged previously ahead of a next access request.

It is also preferable that for the sequential access requests, the access-request rearranging means rearrange access requests which contend with access requests rearranged previously, one by one, in a same order as a previous rearrangement order.

It is preferable that for the plurality of access requests input from the access-request accepting means, the access-request rearranging means refer to a next first access request to rearrange an access request which does not contend with the next first access request to a last access request.

The access-request rearranging means preferably includes an access-cycle computing section and a data rearranging section.

The access-cycle computing section computes a number of access cycles for sequential access requests input from the access-request accepting means, and rearranges the sequential access requests in such a way that the access cycles after rearrangement become shortest.

In response to rearrangement of the access requests in the access-cycle computing section, the data rearranging section rearranges corresponding data according.

Preferably, the memory control apparatus further includes a write-access request cache means, provided between the access-request accepting means and the access-request rearranging means, and the write-access request cache means has a first cache memory, and a first determination/control section.

The first determination/control section performs a process of sending data saved in the first cache memory to the bus when data corresponding to a read command in the access requests input from the access-request accepting means is saved in the first cache memory, or saves a write command in the access requests input from the access-request accepting means when data corresponding to the write command is not saved in the first cache memory but is savable in the first cache memory, or performs a process of sending access requests input from the access-request accepting means to the access-request rearranging means when data corresponding to a read command in the access requests input from the access-request accepting means is not saved in the first cache memory, or when data corresponding to a write command in the access requests input from the access-request accepting means is not saved in the first cache memory and is not savable in the first cache memory.

Preferably, the memory control apparatus further includes a read access request cache means, provided between the access-request accepting means and the access-request rearranging means, and the read access request cache means has a second cache memory, and a second determination/control section.

The second determination/control section performs a process of saving data corresponding to an access request corresponding to a read command in the access requests input from the access-request accepting means in the second cache memory, and sending the saved data to the bus upon reception of an access request corresponding to the access request saved in the second cache memory and corresponding to the read command from the access-request accepting means.

It is preferable that the storage unit perform a refresh operation in a predetermined cycle, and the memory control apparatus include a refresh-command issuing means connected to the storage unit.

The refresh-command issuing means causes the storage unit to perform the refresh operation when sequential access requests cannot be rearranged to provide an access interval of a predetermined time or less due to contention of previous accesses to the storage unit within a predetermined time before the refresh cycle.

It is preferable that when a sequential access break notification signal indicating that there is a break in sequential access requests output to the bus from the data processing units is output to the access-request rearranging means from the bus arbitrating unit, the access-request rearranging means adjust the sequential access requests according to the sequential access break notification signal.

It is preferable that the access-request rearranging means determine a number of the sequential access requests to be processed according to a priority of that of the data processing units which is determined in advance.

According to another embodiment of the present invention, there is provided a memory access system including a bus, a single storage unit with a bank structure, a bus arbitrating unit which arbitrates data write requests to the storage unit from a plurality of data processing units connected to the bus, or a data read request from the storage unit does not cause contention, the memory control apparatus including, and any one of the above-described memory control apparatuses.

According to a further embodiment of the present invention, there is provided a memory control method to be adopted by a memory control apparatus disposed in a memory access system having a bus, a single storage unit with a bank structure, and a bus arbitrating unit which arbitrates data write requests to the storage unit from a plurality of data processing units connected to the bus, or a data read request from the storage unit does not cause contention. The memory control method includes the steps of: accepting access request ; and rearranging access request. The access-request accepting step accepts a plurality of sequential access requests for data located at sequential addresses in the storage unit, a plurality of sequential access requests for data located at discrete addresses in the storage unit, as a plurality of sequential access requests, or access requests for data located at sequential addresses in the storage unit which cannot be made into a single access request, as a plurality of sequential access requests. The access-request rearranging step rearranges at least sequential access requests accepted in the access-request accepting step in an order of banks of the storage unit within a range of access requests relating to either a data write request output from one of the data processing units or a data read request output therefrom to control an access control of the storage unit.

According to a still further embodiment of the present invention, there is provided a program to be adopted by a memory control apparatus disposed in a memory access system having a bus, a single storage unit with a bank structure, and a bus arbitrating unit which arbitrates data write requests to the storage unit from a plurality of data processing units connected to the bus, or a data read request from the storage unit does not cause contention, the program allowing a computer to execute at least an access-request accepting procedure; and an access-request rearranging procedure. The access-request accepting procedure includes a step of accepting a plurality of sequential access requests for data located at sequential addresses in the storage unit, a plurality of sequential access requests for data located at discrete addresses in the storage unit, as a plurality of sequential access requests, or access requests for data located at sequential addresses in the storage unit which cannot be made into a single access request, as a plurality of sequential access requests. The access-request rearranging procedure includes a step of rearranging at least sequential access requests accepted in the access-request accepting procedure in an order of banks of the storage unit within a range of access requests relating to either a data write request output from one of the data processing units or a data read request output therefrom to control an access control of the storage unit.

According to the embodiment of the present invention, a memory access system with an improved access efficiency to a storage unit can be provided.

According to the embodiment of the present invention, a memory control apparatus which is adaptable to a memory access system and has an improved access efficiency to a storage unit can be provided.

According to the embodiment of the present invention, a memory control method which is adaptable to a memory access system and has an improved access efficiency to a storage unit can be provided.

According to the embodiment of the present invention, a program which is adaptable to a memory access system and has an improved access efficiency to a storage unit can be provided.

BRIEF DESCRIPTION OF THE DRAWINGS

FIGS. 3A to 3C are diagrams illustrating how to make an access request according to an embodiment of the invention (FIG. 3B) and how to make an access request according to a related art (FIG. 3C);

FIGS. 4A to 4F are diagrams showing the address arrangement when there are four sequential address requests at a maximum;

FIG. 5 is a table representing a pattern of the number of sequential transfers;

FIGS. 6A to 6E are diagrams showing rearrangement of access requests;

FIGS. 7A to 7C are diagrams showing another example of rearrangement of access requests;

FIGS. 8A to 8C are diagram showing an example of rearrangement of commands;

FIG. 9 is a diagram showing another example of rearrangement of commands;

FIGS. 14A and 14B are diagrams explaining the refresh operation explained referring to FIGS. 13A and 13B;

FIGS. 15A to 15C are diagrams showing a case where contention of access requests cannot be resolved;

FIG. 17 is a diagram exemplifying a bus arbitration method which is carried out by a bus arbiter;

FIGS. 18A and 18B are diagrams showing an example where sequential access requests from bus masters are transferred from a same bus master;

FIGS. 19A and 19B are diagrams showing that changing of a bus master identification signal (ID) and a location at which a read access (R) and a write access (W) are changed are determined as a break in sequential accesses.

DETAILED DESCRIPTION OF THE PREFERRED EMBODIMENTS

Embodiments of a memory access system, a memory control apparatus, a memory control method, and a program according to the present invention are described below with reference to the accompanying drawings.
First Embodiment FIG. 1 shows the configuration of a memory access system in which a memory access control technique according to an embodiment of the invention is adapted to a general memory bus structure.

Figure 1:
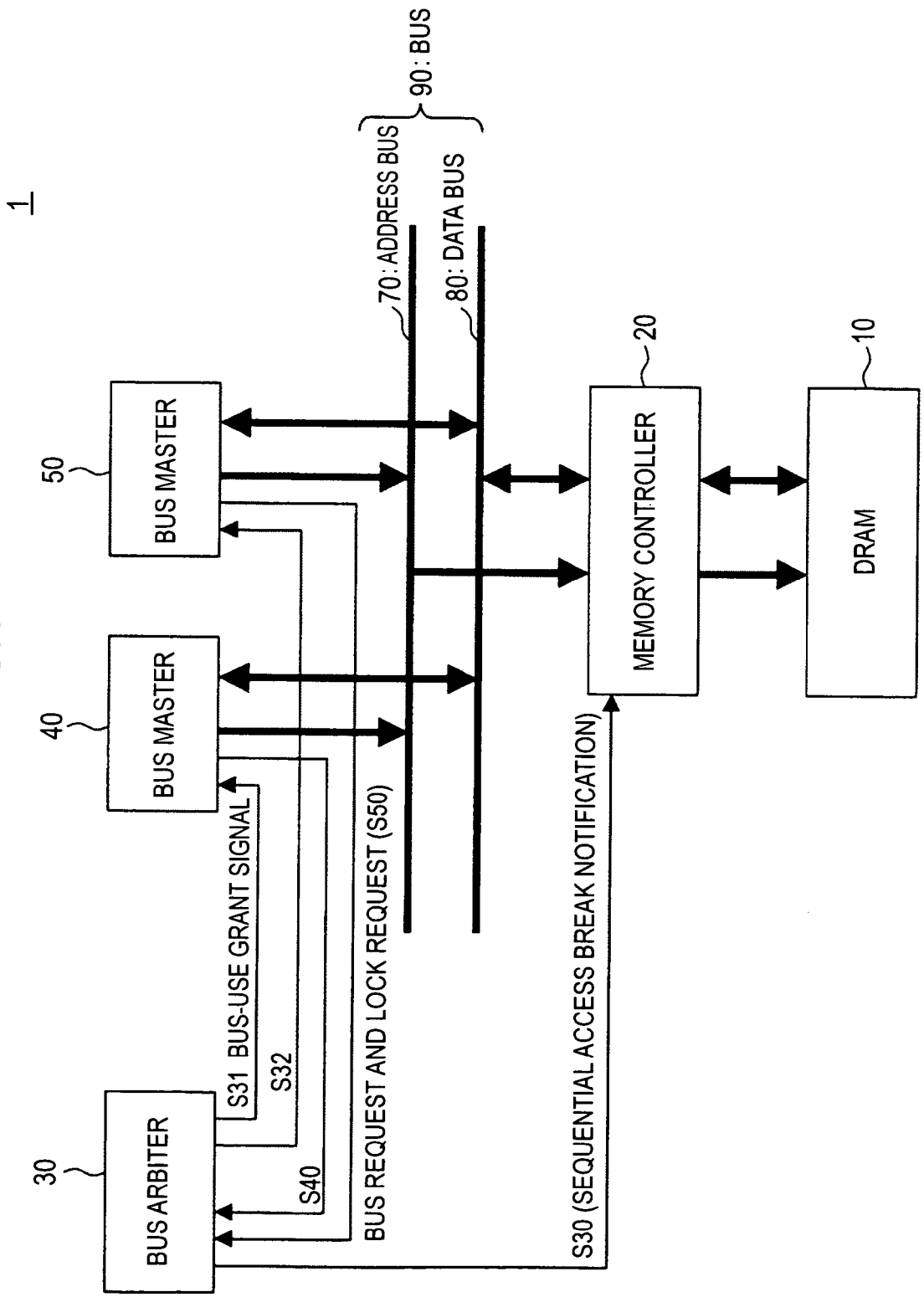
FIG. 1 is a diagram showing the configuration of a memory access system when a memory controller according to an embodiment of the present invention is adapted to a general memory bus structure.

A memory access system 1 shown in FIG. 1 includes a dynamic random access memory unit (DRAM) 10 as one example of a storage unit (memory), a memory controller 20 as a memory control apparatus, a bus arbiter (bus arbitrating section) 30 as a bus arbitrating unit, an address bus 70, and a data bus 80.

The address bus 70 and the data bus 80 are called bus 90 as their general term.

A first bus master 40 and a second bus master 50 are connected to the bus 90 as data processing units which make a data write request or a data read request to the DRAM 10 via the bus 90.

Although the bus masters as data processing unit are not limited to those two bus masters, and a plurality of bus masters may be provided, FIG. 1 shows the case where two bus masters are provided to simplify the illustration.

The DRAM 10 has a plurality of banks each of which is accessible.

Figure 2:
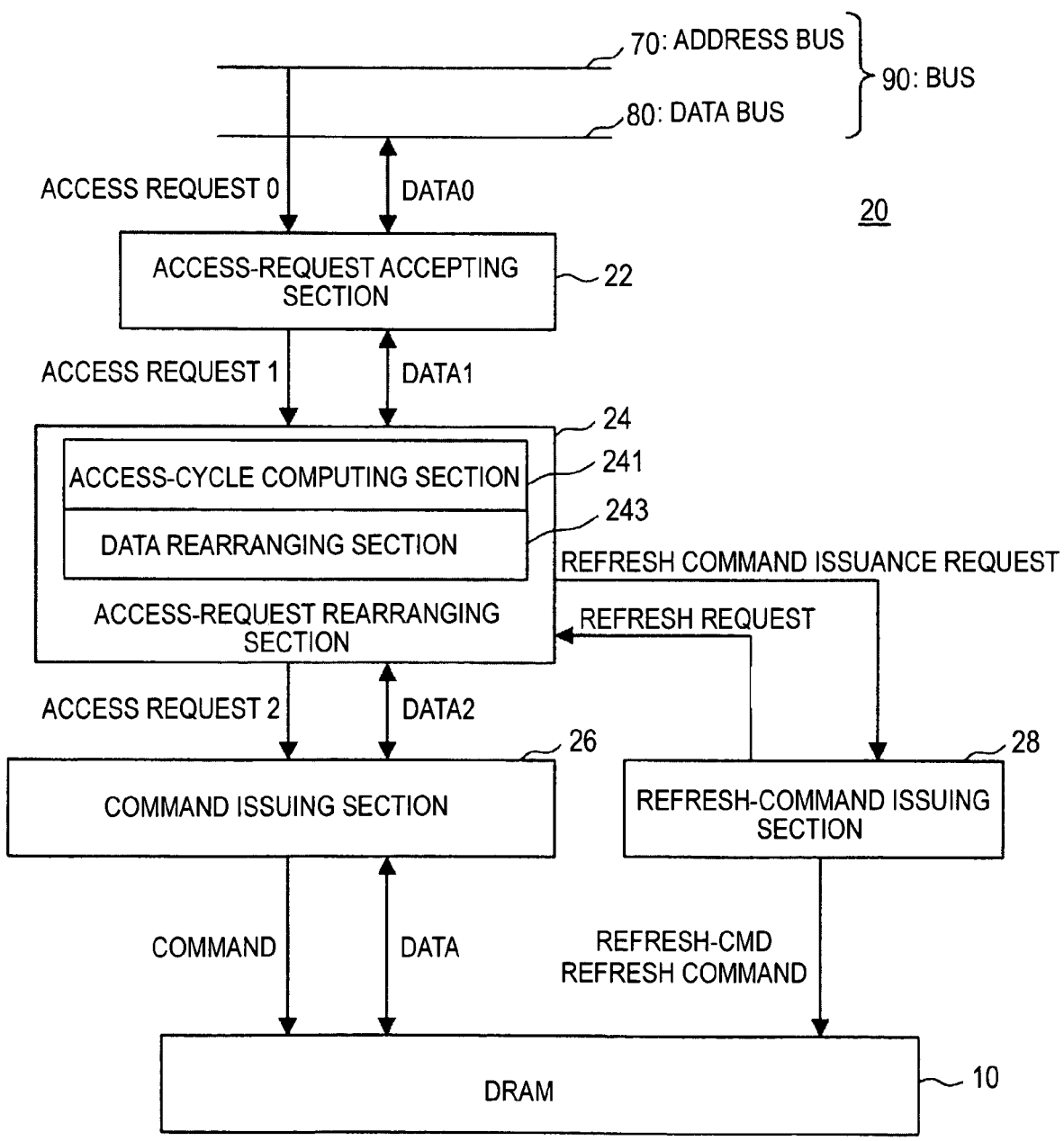
FIG. 2 is a diagram showing the configuration of a memory controller as a first embodiment of the invention to be adapted to the memory access system shown in FIG. 1.

FIG. 2 is a diagram showing the configuration of the memory controller as a first embodiment of the invention to be adapted to the memory access system 1 shown in FIG. 1.

The memory controller 20 shown in FIG. 2 includes an access-request accepting section 22, an access-request rearranging section 24, a command issuing section 26, and a refresh-command issuing section 28.

The access-request accepting section 22 is connected to the bus 90 or the address bus 70 and data bus 80 at one side. The access-request accepting section 22 is connected to the access-request rearranging section 24 at the other side.

The access-request rearranging section 24 is connected to the access-request accepting section 22 at one side, and connected to the command issuing section 26 at the other side.

The command issuing section 26 is connected to the access-request rearranging section 24 at one side, and connected to the DRAM 10 at the other side.

The refresh-command issuing section 28 is connected to the access-request rearranging section 24 and the DRAM 10.

The operation of the memory controller 20 is described below.

The access-request accepting section 22 receives an access request ACC-REQ0 of a unit which can be made into a single read command or write command through the address bus 70, and transfers the received access request to the access-request rearranging section 24.

The access-request accepting section 22 receives data DATA0 corresponding to the access request ACC-REQ0 simultaneously with reception of the access request ACC-REQ0 from the data bus 80, and transfers the received DATA0 to the access-request rearranging section 24.

The access-request rearranging section 24 has an access-cycle computing section 241 and a data rearranging section 243.

The access-cycle computing section 241 computes the order of access requests, transferred from the access-request accepting section 22, which makes the access cycle shorter, and rearranges the access requests in the computed order.

The data rearranging section 243 rearranges data DATA1 transferred from the access-request accepting section 22 according to the order rearranged by the access-cycle computing section 241.

The rearrangement of data in the data rearranging section 243 is carried out at the same timing as the rearrangement of access requests at the time of writing data to the DRAM 10, and after data is read out at the time of reading data from the DRAM 10.

The access requests rearranged by the access-request rearranging section 24 are transferred to the command issuing section 26.

The detailed operation of the access-request rearranging section 24 is described later as various embodiments referring to the accompanying drawings.

The command issuing section 26 issues an access request (read command or write command) transferred from the access-request rearranging section 24 to the DRAM 10 in such a way as to meet a specified timing as a command which matches with the specifications of the DRAM 10.

The refresh-command issuing section 28 is also connected to the DRAM 10 to issue a command to control the refresh operation for data stored (retained or saved) in the DRAM 10.

The operation of the bus arbiter (bus arbitrating section) 30 is briefly described below. The detailed operation of the bus arbiter 30 is described later referring to FIGS. 17 and 18, for example.

When the first bus master 40 uses the bus 90, the first bus master 40 sends the bus arbiter 30 a "bus request" signal requesting the use of the bus or a "lock request" signal requesting that the bus be locked, i.e., a first bus request/lock request signal S40. The "bus request" or "lock request" is described later referring to FIGS. 18A and 18B.

The bus arbiter 30, which has received the first bus request/lock request signal S40 from the first bus master 40, determines the status of the bus 90. To allow the bus 90 to be available to the first bus master 40, the bus arbiter 30 sends the first bus master 40 a first bus-use grant signal S31 indicating that the bus usage by the first bus master 40 is granted.

Likewise, when the second bus master 50 uses the bus 90, the second bus master 50 sends a second bus request/lock request signal S50 to the bus arbiter 30. The bus arbiter 30, which has received the second bus request/lock request signal S50, determines the status of the bus 90. To allow the bus 90 to be available to the second bus master 50, the bus arbiter 30 sends the second bus master 50 a second bus-use grant signal S32 indicating that the bus usage by the second bus master 50 is granted.

A sequential access break notification signal S30 notifying a break in sequential accesses is supplied to the memory controller 20 as needed from the bus arbiter 30 which arbitrates contention of the bus 90. The issuance of the sequential access break notification signal S30 from the bus arbiter 30 is described later.

FIGS. 3A to 3C are diagrams illustrating how to make an access request according to an embodiment of the invention (FIG. 3B) and how to make an access request according to a related art (FIG. 3C). According to the exemplified embodiment, up to two sequential access requests are accepted.

FIG. 3A shows the arrangement of addresses.

As shown in FIG. 3A, for example, when the first bus master 40 transfers six discrete access requests A1, A3, A5, A7, A9 and A11 to the address bus 70, and the second bus master 50 transfers six sequential access requests B1, B2, B3, B4, B5 and B6 to the address bus 70, those access requests are transferred to the address bus 70 while being arbitrated by the bus arbiter 30 in the address bus 70.

In the example shown in FIG. 3B, while one access request for discrete addresses is transferred each time, access requests for sequential addresses are transferred, two at a time, through the address bus 70 without carrying out the burst transfer within the thick solid-lined frames.

FIG. 3C shows a case where two access requests are fairly transferred from one bus master, regardless of whether addresses are discrete or sequential.

The comparison of the illustration of FIG. 3B with the illustration of FIG. 3C shows that although the same amount of data is transferred, the transfer is completed quicker in the case shown in FIG. 3C.

According to the embodiment, data transfer is carried out by the method shown in FIG. 3C.

FIGS. 4A to 4F are diagrams showing the address arrangement when there are four sequential address requests at a maximum.

FIG. 4A shows the address arrangement when address requests do not cross over the boundary.

FIG. 4B shows a case where address requests are separated two each for the address arrangement in FIG. 4A is discrete, and two address requests which can be subjected to burst transfer are transferred two at a time.

FIG. 4C shows a case where address requests for discrete addresses are transferred sequentially.

FIG. 4D shows the address arrangement when address requests cross over the boundary.

FIG. 4E shows a case where address requests are separated two each at a portion crossing the boundary for the addresses in FIG. 4D cross over the boundary, and two address requests are transferred two at a time.

FIG. 4F shows a case where while addresses cross over the boundary, four address request are transferred sequentially.

According to the embodiment, as shown in FIGS. 4C and 4F, access requests can be transferred sequentially. As a result, the amounts of data per sequential transfer can be made almost the same, regardless of sequential addresses or discrete addresses, or whether addresses cross over the boundary of the address arrangement.

The number of sequential access requests is not limited to four in the examples exemplified above, and can be optional.

FIG. 5 is a table representing a pattern of the number of sequential transfers.

In a case where the memory access system 1 according to the embodiment of the invention is adapted to, for example, an image processing system, when the amount of data transfer is known in advance, as in transfer of image data, a plurality of access requests are known in advance. In this case, a plurality of access requests can typically be made sequentially at or under the upper limit by setting the amount of transfer to, for example, 4 until eight access requests remain when the number of the remaining access requests is equal to or greater than 8, and to the numbers shown in the table when the number of the remaining access requests is less than 8, or 1 to 7.

When the number of access requests known is equal to 7, for example, four access requests are transferred sequentially, followed by sequential transfer of three access requests. Particularly, as the number of sequential upper limits of access requests is set to an integer multiple of the number of banks of the DRAM 10, accesses with a high rearrangement efficiency can be achieved in transfer.

That is, because the access-request rearranging section 24 performs rearrangement within the range of sequential access requests, multiple access requests may always be made sequential when there are a plurality of access requests known.

Although the number of sequential upper limits of access requests is 4 in transfer, the number is not restrictive.

FIGS. 6A to 6E are diagrams showing rearrangement of access requests.

In FIG. 6A, three bus masters A, B and C respectively transfer read commands A3R, A4R, write commands B3W, B4W, and read commands C4R, C1R.

For example, "A3R" means that the bus master A transfers a read command for the bank 3. Further, "B3W" means that the bus master B transfers a write command for the bank 3.

This examples shows that data written in the bank 4 by the write command "B4W" transferred from the bus master B is read by the read command "C4R" transferred from the bus master C.

FIG. 6B and FIG. 6C show methods according to the related art.

In the thick solid-lined frames shown in FIG. 6B, commands are subjected to burst transfer as access requests, and separated command by command. Thereafter, rearrangement including rearrangement among bus masters is carried out.

Given that such rearrangement including rearrangement among bus masters is carried out, the original order of access requests transferred from the bus masters shows that the bus master C performs reading (readout) of data from the bank 4 after the bus master B performs data write (data writing) to the bank 4.

As shown in FIG. 6C, (a) first rearrangement among the bus masters is performed. That is, rearrangement to set the write commands B3W, B4W of the bus master B behind the read commands C4R, C1R from the bus master C. (b) Then, rearrangement in a bus master is performed. That is, the read commands C4R, C1R transferred from the bus master C are rearranged with the command for the bank 1 being positioned ahead of the command for the bank 4.

As a result, according to the rearranged commands, data written in the bank 4 by the command "B4W" transferred from the bus master B cannot be read by the command "C4R" transferred from the bus master C.

It is to be noted that data rearrangement in the order of access requests after data writing or data reading does not overcome the problem. It is therefore necessary to limit the method to a usage in which data does not change.

FIG. 6D and FIG. 6E show a method according to another embodiment of the invention.

In this example, as shown in FIG. 6E, the access-request rearranging section 24 rearranges only the commands C4R, C1R transferred from the bus master C.

That is, according to the embodiment, access requests are rearranged only under the conditions that the bus master is the same, and sequential access requests are involved in either reading or writing. As a result, data reading/writing does not change even if the sequential number of access requests is changed.

Apparently, the foregoing problem can be overcome by rearranging commands from one bus master and without rearranging commands among bus masters.

FIGS. 7A to 7C are diagrams showing another example of rearrangement of access requests.

In FIG. 7A, read commands A1R, A2R, read commands B2R, B3R, and read commands C4R, C1R are respectively transferred from three bus masters A, B and C.

FIG. 7B shows a method according to the related art. Each of read requests from the bus master B and the bus master C is divided into two commands, and two of the divided four commands are arranged as the last two. Accordingly, data of the four commands needs to be transferred to the bus by execution of the last two commands, which results in concentrated data transfer to the bus, causing bus contention.

FIG. 7C shows a method according to an embodiment of the invention. The access-request rearranging section 24 rearranges access requests only under the conditions that the bus master is the same, and sequential access requests to the banks of the DRAM 10 are involved in either reading or writing. This can prevent the temporary concentration of transfer to the bus, so that contention can be avoided.

FIGS. 8A to 8C are diagrams showing an example of rearrangement of commands.

As shown in FIG. 8A, commands from the bus master B are transferred after transfer of commands from the bus master A.

FIG. 8B shows an example where the access-request rearranging section 24 changes the order of the commands from the bus master B from B4R, B3R, B2R, B1R to B1R, B4R, B3R, B2R. In this case, the last command A4R (bank 4) from the bus master A does not contend with the bank 1 for the first command B1R from the bus master B.

FIG. 8C shows an example where the access-request rearranging section 24 changes the order of the commands from the bus master B from B4R, B3R, B2R, B1R to B1R, B2R, B3R, B4R. In this case, the last command A4R (bank 4) from the bus master A does not likewise contend with the bank 1 for the first command B1R from the bus master B.

Apparently, the access-request rearranging section 24 can improve the efficiency of accesses to the DRAM 10 by rearranging commands.

FIG. 9 is a diagram showing another example of rearrangement of commands.

FIG. 9 shows an example where the access-request rearranging section 24 (a) changes the order of the access requests in such a way that the last bank 4 for the bus master A does not contend with the first bank 1 for the bus master B, and further (b) rearranges commands in such a way that the last bank 3 for the bus master B does not contend with the first bank 4 for the bus master C.

As the bus master C makes a request to read data from the bank 4 by the command C4R, the access-request rearranging section 24 performs rearrangement in such a way that the command B3R for the bank 3, not the bank 4, is arranged in the last bank for the bus master B.

The first embodiment described above has the following advantages.

(1) When there is data, granting sequential issuance of a plurality of access requests can reduce a variation in the size of data to be sequentially transferred between bus masters. As a result, for the same amount of data, the efficiency of memory access can be improved by rearranging setting the transfer times substantially the same and rearranging a plurality of access requests from the same bus master.

(2) As rearrangement is carried out only under the condition of either data reading by the same bus master or data writing by the same bus master, the amount of memory access becomes equal to the amount of transfer to a bus master. This results in avoidance of transferring a larger amount of data through the bus in few memory accesses, reducing bus contentions.

Second Embodiment

Figure 10:
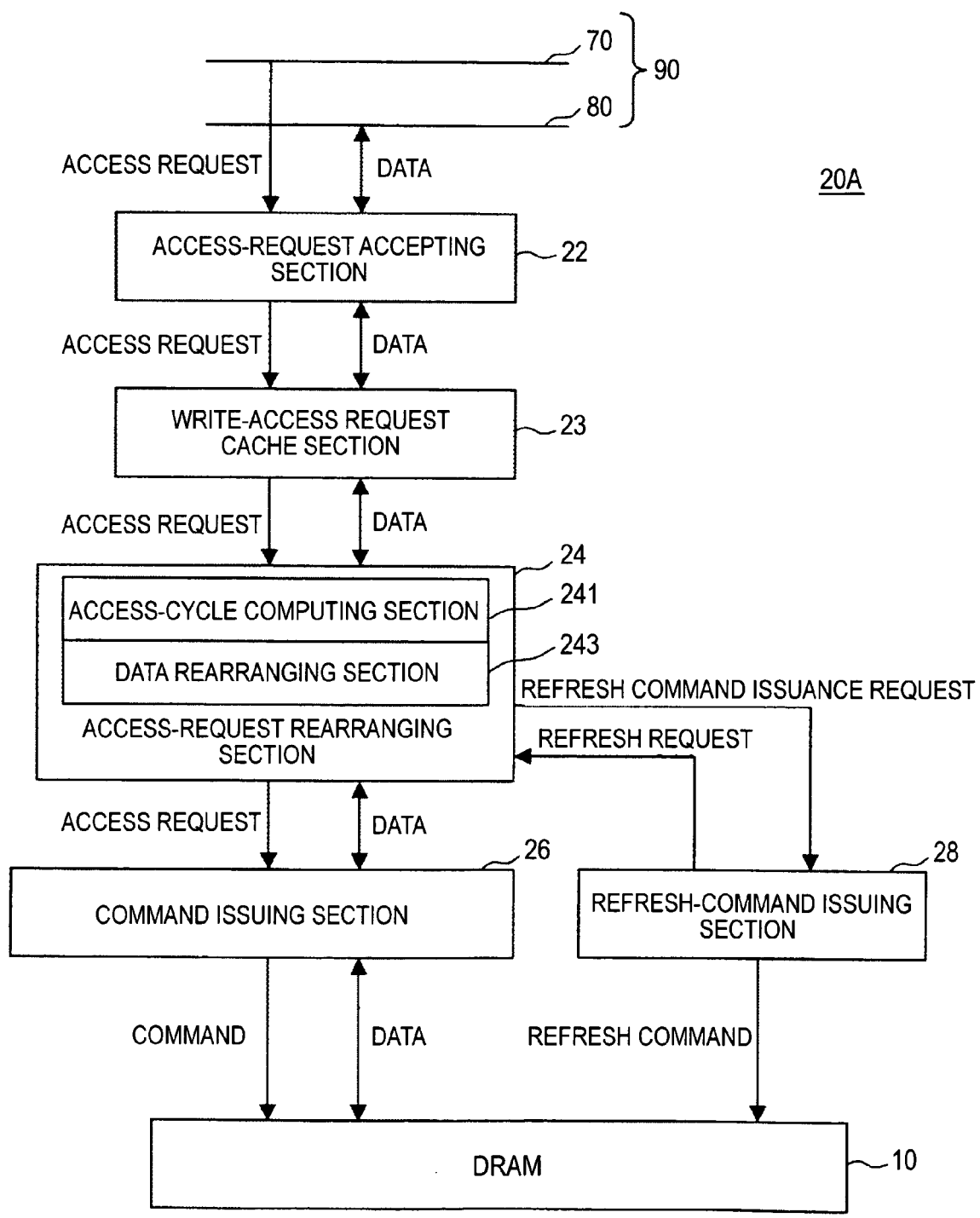
FIG. 10 is a diagram showing the configuration of a memory controller as a second embodiment of the invention to be adapted to the memory access system shown in FIG. 1.

FIG. 10 is a diagram showing the configuration of a memory controller 20A according to a second embodiment of the invention to be adapted to the memory access system 1 shown in FIG. 1.

The memory controller 20A according to the second embodiment shown in FIG. 10 has a write-access request cache section 23 added between the access-request accepting section 22 and the access-request rearranging section 24 as compared with the memory controller 20 according to the first embodiment shown in FIG. 2.

The write-access request cache section 23 has a first cache memory which saves a write access request, and a first determination/control section which determines whether a command is hit (neither component shown).

FIGS. 11A to 11D are diagrams illustrating the operation of the write-access request cache section 23.

Figure 11B:
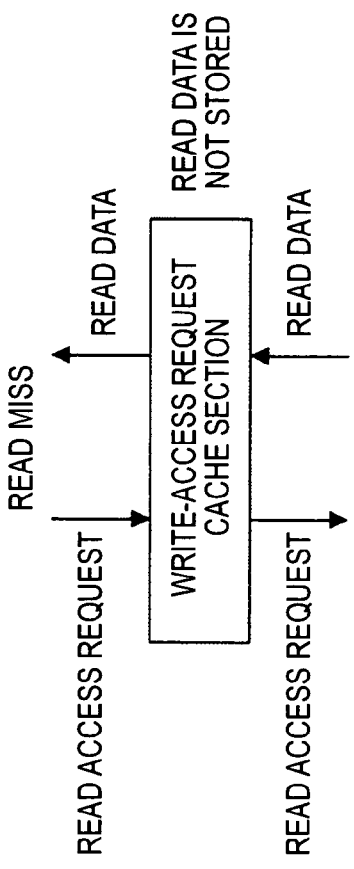
FIGS. 11A to 11D are diagrams illustrating the operation of a write-access request cache means shown in FIG. 10.
Figure 11A:
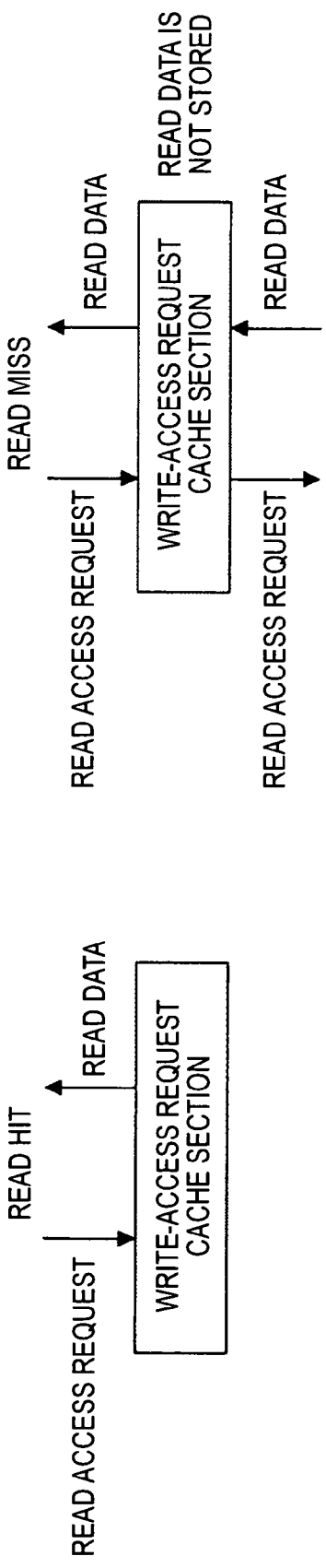

As shown in FIG. 11A, when the first determination/control section in the write-access request cache section 23 determines that a read command is hit, the first determination/control section in the write-access request cache section 23 returns data stored in the first cache memory in the previous operation to the data bus 80 without transferring an access request to the access-request rearranging section 24.

The term "hit" used herein means that there is a read request or write request from a bus master which matches with data stored in the first cache memory in the write-access request cache section 23.

When a read command is not hit as shown in FIG. 11B, on the other hand, the first determination/control section transfers an access request to the access-request rearranging section 24 as in the above-described operation. The access-request rearranging section 24 performs the above-described rearranging process. Thereafter, the above-described process is carried out.

Figure 11D:
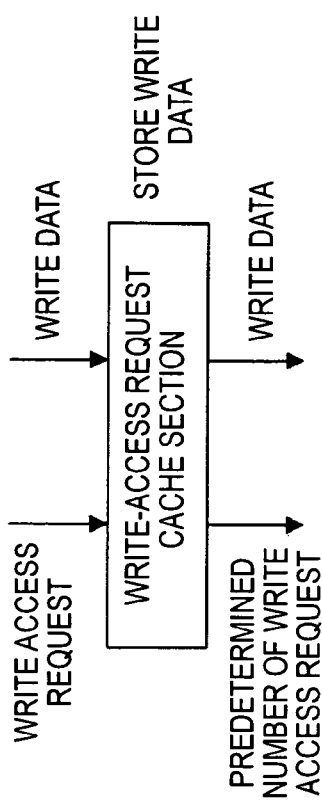
Figure 11C:
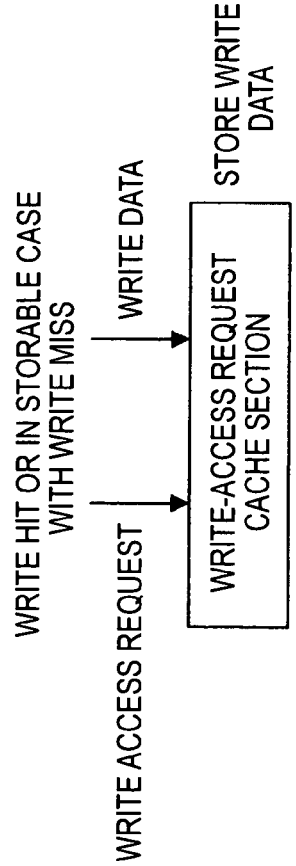

In a case where a write command is hit, or an access request can be stored in the first cache memory in the write-access request cache section 23 when a write command is not hit, as shown in FIG. 11C, the first determination/control section in the write-access request cache section 23 stores the access request in the first cache memory.

A description is given of a case where a write command is not hit and cannot be stored in the first cache memory as shown in FIG. 11D. The first determination/control section in the write-access request cache section 23 sends the access-request accepting section 22 sequential access requests including at least one of the access request for the current write command and the access request stored in the first cache memory.

This can allow a plurality of access requests to be sequential.

Even when there is a read access request after a write access request, data before the write access request is not transferred to the data bus 80.

Figures 12A, 12B, 12C:
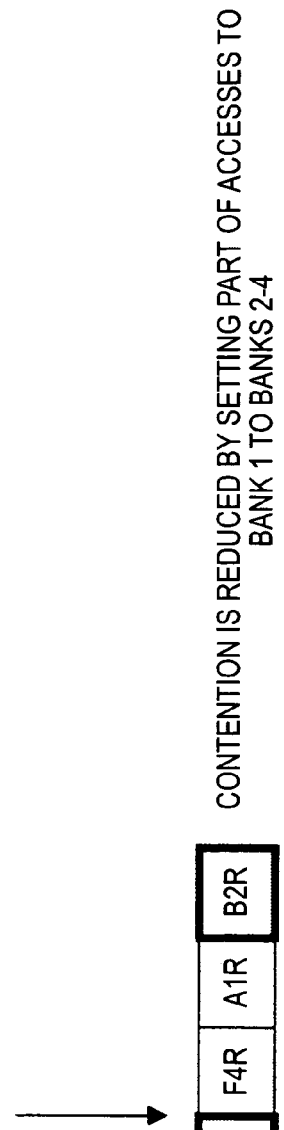
FIGS. 12A to 12C are diagram explaining that read-only data is stored in a plurality of banks of a DRAM in advance, and is substituted for data to be read from another bank when there is a bank contention.

FIGS. 12A to 12C are diagrams explaining that read-only data is stored in a plurality of banks of the DRAM 10 in advance, and is substituted for data to be read from another bank when there is a bank contention.

In FIGS. 12A to 12C, symbols A to J indicate types of data, and numerals indicate the banks of the DRAM 10. The same symbol indicates that same data is stored in a bank.

In case of reading data from the banks of the DRAM 10 in the order of CABFAB, when the access-request accepting section 22 receives access requests through the address bus 70 in the order of C1, A1, B1, F4, A4, B1 as shown in FIG. 12B, the banks for data A and data B are changed to change the banks to the banks of C1, A2, B3, F4, A1, B2 as shown in FIG. 12C for data A and data B are saved (stored) in a plurality of banks of the DRAM 10.

Bank contentions can be reduced by changing the order of the banks in the access-request rearranging section 24, shortening the time needed for access as a consequence.

Figure 13A:
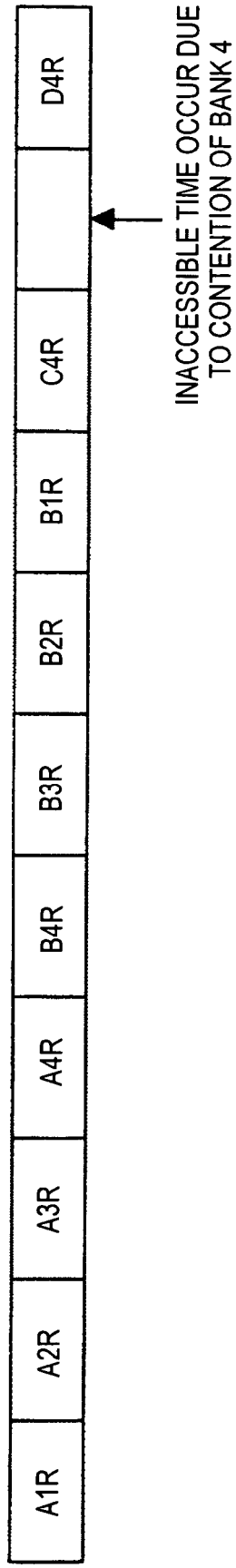
FIGS. 13A and 13B are diagrams illustrating an example of a refresh operation in the DRAM.
Figure 13B:
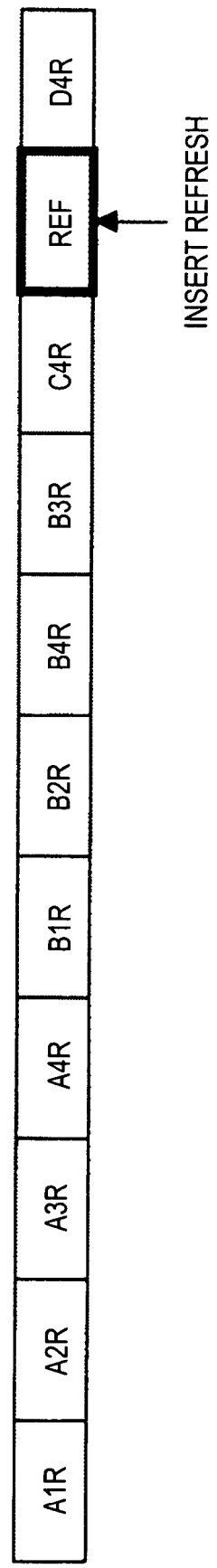

FIGS. 13A and 13B are diagrams illustrating an example of the refresh operation.

FIG. 13A is a diagram showing a case where the bank 4 of the DRAM 10 is used continuously because of access requests, making a free access time between commands C4R and D4R.

FIG. 13B shows a case where to overcome the drawback that a free access time is produced, the refresh-command issuing section 28 issues a refresh command REF to the DRAM 10 according to a "refresh-command issuance request" signal from the access-request rearranging section 24 when the refresh time limit is close. This process can reduce the insertion of refresh when the access interval can be shortened. This makes it possible to avoid the refresh-originated operation time of the DRAM 10.

Referring to FIGS. 14A and 14B, the operation explained referring to FIGS. 13A and 13B is described.

FIGS. 14A and 14B are diagrams explaining the refresh operation of the DRAM 10.

As shown in FIG. 14A, a predetermined time "refresh insertion period" to insert refresh when an access cannot be made shorter before the refresh time limit is provided followed by an "forced refresh insertion period" to forcibly insert refresh. This can set the refresh interval to a given interval or shorter, so that refresh in the DRAM 10 is not generated as much as possible when an access cannot be made shorter.

FIG. 14B is a diagram showing a case where there refresh insertion period and the forced refresh insertion period mentioned referring to FIG. 14A are not provided.

FIGS. 15A to 15C are diagrams showing a case where contention of access requests cannot be resolved.

FIG. 15A is a diagram showing a state similar to the one shown in FIG. 13A.

In this case, as shown in FIG. 15C, a read access request for an address which belongs to the upper address or lower address of the read access request and whose access is not requested is generated by the access-request rearranging section 24 and is inserted in a free space shown in FIG. 15A.

This can reduce bank contentions in the DRAM 10.

Figure 16:
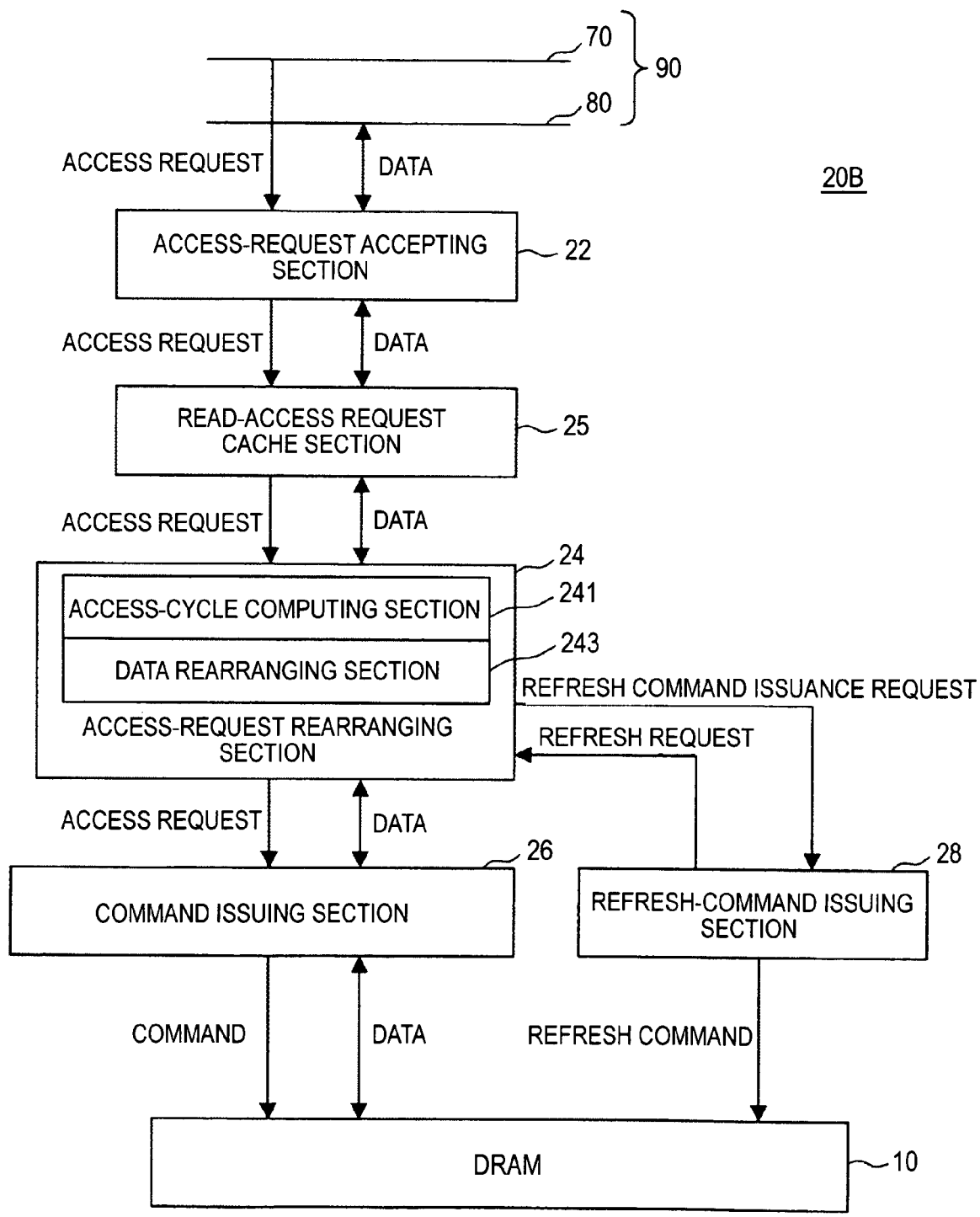
FIG. 16 is a diagram showing the configuration of a memory controller according to a third embodiment of the invention to be adapted to the memory access system shown in FIG. 1.

Another improving approach is described as a third embodiment referring to FIG. 16.

The second embodiment of the present invention has the following advantages.

(1) As the write-access request cache section 23 which can store data only in a write operation is provided, it is possible to change a fewer number of sequential access requests to a larger number of sequential access requests. This results in a rearrangement-based improvement on the access efficiency.

(2) The access efficiency can be improved by storing same read-only data in a plurality of banks and changing banks to read data according to a bank contention.

(3) Refresh of the DRAM 10 is performed only when there is an access contention, so that with absence of an access contention, a refresh operation is performed on the DRAM 10 to prevent the access efficiency of the DRAM 10 from dropping.

Third Embodiment

FIG. 16 is a diagram showing the configuration of a memory controller 20B according to a third embodiment of the invention to be adapted to the memory access system 1 shown in FIG. 1.

As compared with the configuration of the memory controller 20 shown in FIG. 2, the memory controller 20B shown in FIG. 16 has a read-access request cache section 25 added between the access-request accepting section 22 and the access-request rearranging section 24 in the memory controller 20 shown in FIG. 2.

The read-access request cache section 25 has a second cache memory which saves a read-access only command and a second determination/control section (neither component shown).

The second determination/control section in the read-access request cache section 25 uses a read access request saved in the second cache memory when data of the read access request generated by the access-request rearranging section 24 is saved in the second cache memory as described above referring to FIG. 15C, and the read access request is transferred from a bus master thereafter. That is, read access data to be saved in the second cache memory is inserted in the blank portion in FIG. 15A.

This can allow the read-access request cache section 25 to cope with an access request alone without requiring the processes of the access-request rearranging section 24 and the command issuing section 26.

Fourth Embodiment

FIG. 17 is a diagram exemplifying a bus arbitration method which is carried out by the bus arbiter (bus arbitrating section) 30.

The bus arbiter 30 arbitrates bus usage again when a plurality of sequential access requests are transferred from the same bus master, e.g., when four access requests A1R, A2R, A3R, A4R are transferred from the first bus master 40, i.e., at time t1 when the four access requests are transferred. Likewise, the bus arbiter 30 arbitrates bus usage again when four access requests B1R, B2R, B3R, B4R are transferred from the second bus master 50, i.e., at time t2 when the four access requests are transferred.

FIGS. 18A and 18B are diagrams showing an example where sequential access requests from bus masters are transferred from the same bus master.

FIG. 18A shows a case where transfer from the same bus master continues while access requests are sequential.

As shown in FIG. 18A, when a predetermined number of access requests are transferred from, for example, the bus master A (e.g., first bus master 40), the transfer request is temporarily canceled, and after the bus arbiter 30 identifies it, access requests are output again. At this time, the bus arbiter 30 does not perform bus arbitration while there is a transfer request from the transferring bus master.

That is, when the number of the remaining access requests is 8 or greater, for example, the approach described referring to FIG. 17 is taken, and when the number of the remaining access requests is less than 8, for example, the transfer approach shown in FIG. 18A is taken, thereby suppressing occurrence of a free cycle even if a single bus master is making an access request.

In addition, as shown in FIG. 18B, occurrence of a free cycle can be suppressed by a lock request from a bus master.

FIG. 18B is a diagram showing continued transfer of access requests from the same bus master while locking is effected.

While a plurality of sequential access requests are transferred from the same bus master, this bus master outputs "lock". At this time, the bus arbiter 30 does not perform bus arbitration while there is the lock.

In the example described referring to FIG. 17, a break in sequential accesses is notified to the memory controller 20, 20A, 20B.

In the example described referring to FIGS. 18A and 18B, on the other hand, the bus arbiter 30 transfers the sequential access break notification signal S30, which indicates a break in sequential accesses, to the memory controller 20, 20A, 20B. The sequential access break notification signal S30 can allow the access-request accepting section 22 in the memory controller 20, 20A, 20B to detect a break in sequential accesses.

As shown in FIG. 18A, the access-request accepting section 22 in the memory controller 20, 20A, 20B determines a break in sequential accesses from each lock signal as shown in FIG. 18B.

Fifth Embodiment

In the cases exemplified in FIG. 17 and FIGS. 18A and 18B, when a bus master outputs a unique bus master identification signal (ID) indicating the bus master itself, the access-request rearranging section 24 in the memory controller 20, 20A, 20B can determine changing of the bus master identification signal ID and a location at which a read access R and a write access W are changed as a break in sequential accesses shown in FIGS. 19A and 19B.

FIGS. 19A and 19B are diagrams showing that changing of the bus master identification signal ID and the location at which the read access R and the write access W are changed are determined as a break in sequential accesses.

Sixth Embodiment

Figures 20A, 20B, 20C:
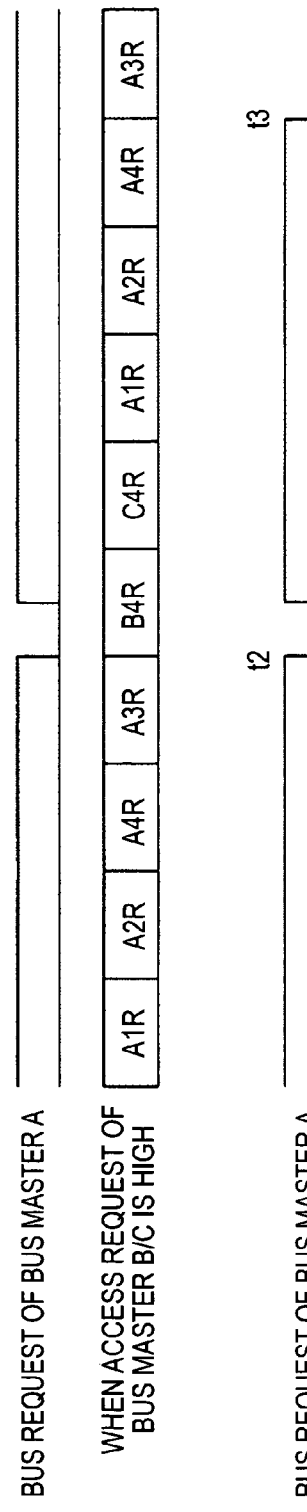
FIGS. 20A to 20C are diagrams showing the relationship between the priority of bus masters and the number of sequential accesses.

FIGS. 20A to 20C are diagrams showing the relationship between the priority of bus masters and the number of sequential accesses.

As shown in FIG. 20A, the priority levels of a plurality of bus masters whose access requests are not sequential are not set to the highest, preventing occurrence of a single bus master generating an access request when there are multiple bus masters with high priority. As a result, lowering the access efficiency can be avoided.

FIG. 20B is a diagram showing that the bus masters B and C have higher priority of access requests than the bus requests of the bus master A.

At timing t1 or later, the request B4R from the bus master B and the request C4R from the bus master C are processed before the requests A1R, A2R, A4R, and A3R from the bus master A.

FIG. 20C is a diagram showing that the bus request from the bus master C has lower priority than the access requests from the bus masters A and B.

At timing t2 or later, the request B4R from the bus master B and the requests A1R, A2R, A4R, and A3R from the bus master A are processed, and at timing t3, the request C4R from the bus master C is processed.

The embodiments of the invention can demonstrate the following advantages.

(1) The memory access efficiency can be improved without changing the access order of different bus masters or the order of accesses from the same bus master which has different read and write modes.

(2) As units of accesses do not cross over banks, it is not necessary to separate the accesses for each memory access unit. Further, a plurality of sequential accesses can be carried out in an arbitrary order.

(3) Even with the restriction on the boundary of bus-based burst accesses, the boundary is accessible by a single read command or write command, making it unnecessary to separate access requests for this purpose.

(4) As a cache which can store data only in a write operation is provided, it is possible to change a fewer number of sequential access requests to a larger number of sequential access requests. This can bring about a rearrangement-based improvement on the access efficiency.

(5) The access efficiency can be improved by storing same read-only data in a plurality of banks and changing banks to read data according to a bank contention.

(6) The refresh operation of the DRAM 10 is performed only when there is an access contention, so that with absence of an access contention, the refresh operation is performed on the DRAM 10 to prevent the access efficiency of the DRAM 10 from dropping.

The foregoing embodiments are to be considered as illustrative examples of the present invention, which can work out in various modifications restrictive to the foregoing embodiments.

For example, the DRAM 10 is one example of the storage unit according to the invention, and a semiconductor storage unit which has a bank structure can be used as well.

The configurations of the memory controllers 20, 20A, 20B described referring to FIGS. 2, 10 and 16 are just illustrative and are not restrictive, and the memory controllers 20, 20A, 20B need to carry out the above-described illustrative operations.

According to the foregoing embodiments, the access-request accepting section 22 can separate a single access request into a plurality of access requests which can be made into a single read command or write command.

The memory controllers 20, 20A, 20B according to the embodiments of the invention, and the memory access system 1 using the memory controller 20, 20A, 20B can be adapted to various apparatuses which allow a plurality of bus masters (data processing units) to write data in a storage unit like the DRAM 10 or to read data therefrom, such as a personal computer, an imaging apparatus which handles image data, a sound recording/reproducing apparatus, an image recording/reproducing apparatus, a display processing apparatus, an industrial robot, a PDA (Personal Digital Assistant), a portable terminal apparatus like a cell phone, a network apparatus, a set-top box, and a game machine.

The present application contains subject matter related to that disclosed in Japanese Priority Patent Application JP 2008-191368 filed in the Japan Patent Office on Jul. 24, 2008, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A memory control apparatus disposed in a memory access system having a bus, a single storage unit with a bank structure, and a bus arbitrating unit which arbitrates data write requests to the storage unit from a plurality of data processing units connected to the bus, or a data read request from the storage unit does not cause contention, the memory control apparatus comprising:
   an access-request accepting means; and
   an access-request rearranging means,
   wherein the access-request accepting means accepts
      a plurality of sequential access requests for data located at sequential addresses in the storage unit,
      a plurality of sequential access requests for data located at discrete addresses in the storage unit, as a plurality of sequential access requests, or
      access requests for data located at sequential addresses in the storage unit which cannot be made into a single access request, as a plurality of sequential access requests, and
   the access-request rearranging means rearranges at least sequential access requests accepted by the access-request accepting means in an order of banks of the storage unit within a range of access requests relating to either a data write request output from one of the data processing units or a data read request output therefrom to control an access control of the storage unit.

2. The memory control apparatus according to claim 1, wherein for the sequential access requests, the access-request rearranging means rearranges an access request which does not contend with a last access request rearranged previously ahead of a next access request.

3. The memory control apparatus according to claim 1, wherein for the sequential access requests, the access-request rearranging means rearranges access requests which contend with access requests rearranged previously, one by one, in a same order as a previous rearrangement order.

4. The memory control apparatus according to claim 1, wherein for the plurality of access requests input from the access-request accepting means, the access-request rearranging means refers to a next first access request to rearrange an access request which does not contend with the next first access request to a last access request.

5. The memory control apparatus according to claim 1, wherein the access-request rearranging means includes:
   an access-cycle computing section that computes a number of access cycles for sequential access requests input from the access-request accepting means, and rearranges the sequential access requests in such a way that the access cycles after rearrangement become shortest; and
   a data rearranging section that rearranges corresponding data according to rearrangement of the access requests in the access-cycle computing section.

6. The memory control apparatus according to claim 1, further comprising a write-access request cache means, provided between the access-request accepting means and the access-request rearranging means,
   wherein the write-access request cache means has
      a first cache memory, and
      a first determination/control section, and
   the first determination/control section
      performs a process of sending data saved in the first cache memory to the bus when data corresponding to a read command in the access requests input from the access-request accepting means is saved in the first cache memory, or saves a write command in the access requests input from the access-request accepting means when data corresponding to the write command is not saved in the first cache memory but is savable in the first cache memory, or performs a process of sending access requests input from the access-request accepting means to the access-request rearranging means when data corresponding to a read command in the access requests input from the access-request accepting means is not saved in the first cache memory, or when data corresponding to a write command in the access requests input from the access-request accepting means is not saved in the first cache memory and is not savable in the first cache memory.

7. The memory control apparatus according to claim 1, further comprising a read-access request cache means, provided between the access-request accepting means and the access-request rearranging means,
wherein the read-access request cache means has a second cache memory, and a second determination/control section, and
the second determination/control section performs a process of saving data corresponding to an access request corresponding to a read command in the access requests input from the access-request accepting means in the second cache memory, and sending the saved data to the bus upon reception of an access request corresponding to the access request saved in the second cache memory and corresponding to the read command from the access-request accepting means.

8. The memory control apparatus according to claim 1, wherein the storage unit performs a refresh operation in a predetermined cycle,
the memory control apparatus includes a refresh-command issuing means which is connected to the storage unit and causes the storage unit to perform the refresh operation when sequential access requests cannot be rearranged to provide an access interval of a predetermined time or less due to contention of previous accesses to the storage unit within a predetermined time before the refresh cycle.

9. The memory control apparatus according to claim 1, wherein when a sequential access break notification signal indicating that there is a break in sequential access requests output to the bus from the data processing units is output to the access-request rearranging means from the bus arbitrating unit, the access-request rearranging means adjusts the sequential access requests according to the sequential access break notification signal.

10. The memory control apparatus according to claim 1, wherein the access-request rearranging means determines a number of the sequential access requests to be processed according to a priority of that of the data processing units which is determined in advance.

11. A memory access system comprising:
a bus;
a single storage unit with a bank structure;
a bus arbitrating unit which arbitrates data write requests to the storage unit from a plurality of data processing units connected to the bus, or a data read request from the storage unit does not cause contention, the memory control apparatus including; and
the memory control apparatus as set forth in any one of claims 1 to 10.

12. A memory control method to be adopted by a memory control apparatus disposed in a memory access system having a bus, a single storage unit with a bank structure, and a bus arbitrating unit which arbitrates data write requests to the storage unit from a plurality of data processing units connected to the bus, or a data read request from the storage unit does not cause contention, the memory control method comprising the steps of:
accepting access request; and
rearranging access request,
wherein the access-request accepting step accepts
a plurality of sequential access requests for data located at sequential addresses in the storage unit,
a plurality of sequential access requests for data located at discrete addresses in the storage unit, as a plurality of sequential access requests, or
access requests for data located at sequential addresses in the storage unit which cannot be made into a single access request, as a plurality of sequential access requests; and
the access-request rearranging step rearranges at least sequential access requests accepted in the access-request accepting step in an order of banks of the storage unit within a range of access requests relating to either a data write request output from one of the data processing units or a data read request output therefrom to control an access control of the storage unit.

13. A program to be adopted to a memory control apparatus disposed in a memory access system having a bus, a single storage unit with a bank structure, and a bus arbitrating unit which arbitrates data write requests to the storage unit from a plurality of data processing units connected to the bus, or a data read request from the storage unit does not cause contention, the program allowing a computer to execute at least:
an access-request accepting procedure; and
an access-request rearranging procedure,
wherein the access-request accepting procedure includes a step of accepting
a plurality of sequential access requests for data located at sequential addresses in the storage unit,
a plurality of sequential access requests for data located at discrete addresses in the storage unit, as a plurality of sequential access requests, or
access requests for data located at sequential addresses in the storage unit which cannot be made into a single access request, as a plurality of sequential access requests, and
the access-request rearranging procedure including a step of rearranging at least sequential access requests accepted in the access-request accepting procedure in an order of banks of the storage unit within a range of access requests relating to either a data write request output from one of the data processing units or a data read request output therefrom to control an access control of the storage unit.

14. A memory control apparatus disposed in a memory access system having a bus, a single storage unit with a bank structure, and a bus arbitrating unit which arbitrates data write requests to the storage unit from a plurality of data processing units connected to the bus, or a data read request from the storage unit does not cause contention, the memory control apparatus comprising:
an access-request accepting section; and
an access-request rearranging section,
wherein the access-request accepting section accepts
a plurality of sequential access requests for data located at sequential addresses in the storage unit,
a plurality of sequential access requests for data located at discrete addresses in the storage unit, as a plurality of sequential access requests, or access requests for data located at sequential addresses in the storage unit which cannot be made into a single access request, as a plurality of sequential access requests; and the access-request rearranging section rearranges at least sequential access requests accepted by the access-request accepting section in an order of banks of the storage unit within a range of access requests relating to either a data write request output from one of the data processing units or a data read request output therefrom to control an access control of the storage unit.

\* \* \* \* \*